United States Patent
Mahany et al.

[19]

[11] Patent Number: 5,870,279
[45] Date of Patent: *Feb. 9, 1999

[54] ANTENNA CAP FOR COMPUTER DEVICE UTILIZING A RADIO CARD

[75] Inventors: Ronald L. Mahany; Guy J. West, both of Cedar Rapids, Iowa

[73] Assignee: Norand Corporation, Cedar Rapids, Iowa

[*] Notice: The term of this patent shall not extend beyond the expiration date of Pat. No. 5,590,346.

[21] Appl. No.: 775,391

[22] Filed: Dec. 31, 1996

Related U.S. Application Data

[63] Continuation of Ser. No. 97,462, Jul. 26, 1993, Pat. No. 5,590,346.

[51] Int. Cl.[6] .................................................. G06F 13/00
[52] U.S. Cl. ...................... 361/679; 343/702; 395/800.01
[58] Field of Search .............................. 395/800, 800.01; 343/803, 702; 361/600, 679

[56] References Cited

U.S. PATENT DOCUMENTS

| | | | |
|---|---|---|---|
| 3,763,512 | 10/1973 | Valihora | 441/16 |
| 4,890,114 | 12/1989 | Egashira | 343/702 |
| 4,940,992 | 7/1990 | Nguyen et al. | 343/803 |
| 5,138,651 | 8/1992 | Sudo | 379/61 |
| 5,202,817 | 4/1993 | Koenck et al. | 361/680 |
| 5,204,687 | 4/1993 | Elliot et al. | 343/702 |
| 5,361,061 | 11/1994 | Mays et al. | 340/825.44 |
| 5,410,141 | 4/1995 | Koenck et al. | 235/472 |
| 5,583,519 | 12/1996 | Koike | 343/702 |

*Primary Examiner*—Alyssa H. Bowler
*Assistant Examiner*—Walter D. Davis, Jr.
*Attorney, Agent, or Firm*—Akin, Gump, Strauss, Hauer & Feld, L.L.P.

[57] ABSTRACT

A computer device for receiving and utilizing a radio card. The radio transceiver is self contained inside the radio card and has antenna contacts disposed on the radio card on one end and an electrical interface on the other. The computer device receives the radio card such that it engages the electrical interface. The computer device additionally has and cap which covers the opening into which the radio has been inserted. Antenna contacts are disposed on the cap to engage the antenna contacts on the radio card. At least one antenna is operably connected to the radio card through the cap. A band is used to attach the cap to the housing of the computer device. The antenna or antennas are embedded in the cap, in the band, or embedded in or attached to the housing of the computer device. Positioning two similar antennas in different position creates an antenna diversity scheme. Shielding can be added to the cap to help reduce the escape of electronic noise. A micro shield ribbon can be used to connect the antenna and the antenna contacts on the cap.

15 Claims, 3 Drawing Sheets

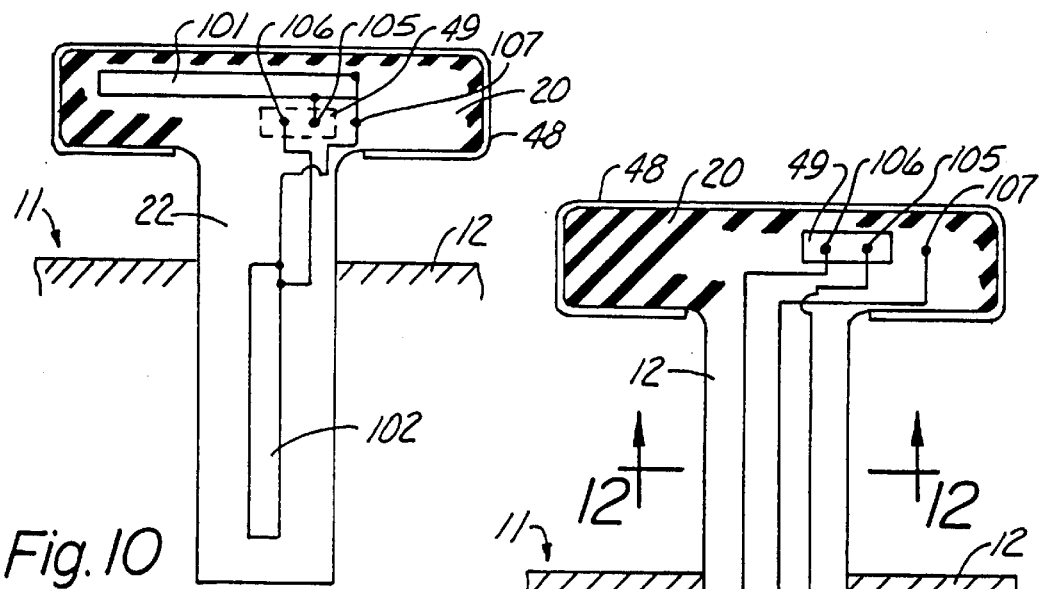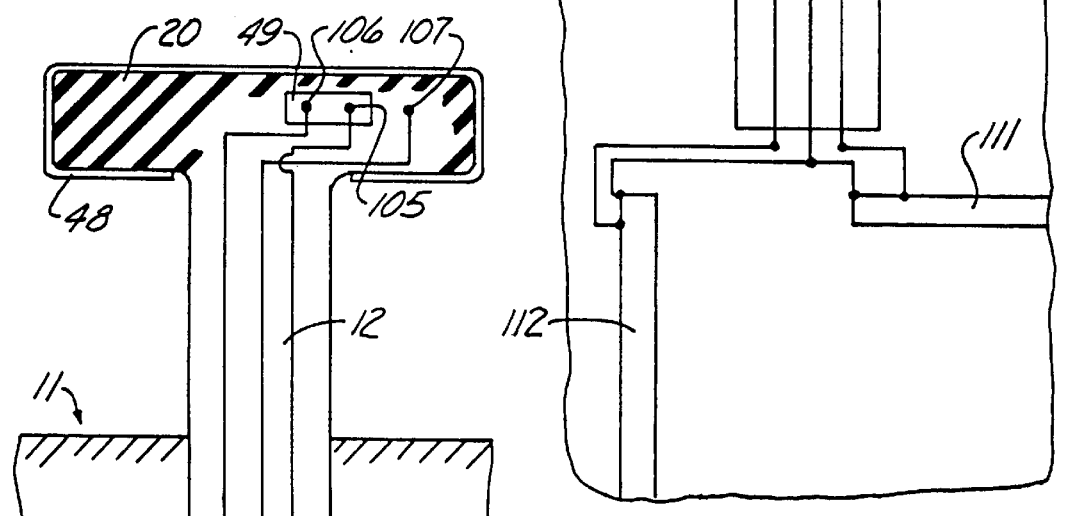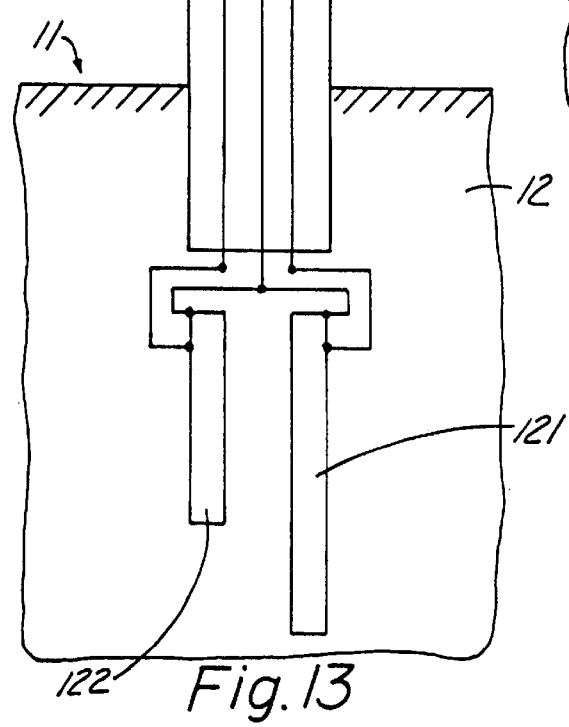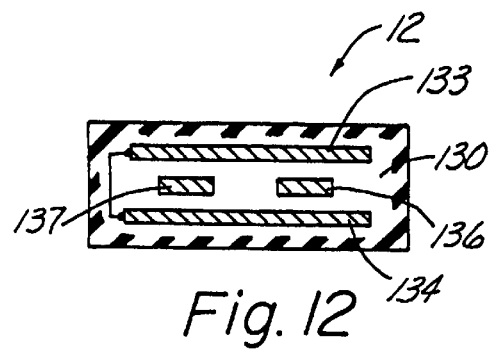
Fig. 10
Fig. 11
Fig. 13
Fig. 12

ANTENNA CAP FOR COMPUTER DEVICE UTILIZING A RADIO CARD

This application is a continuation of application No. 08/097,462, filed Jul. 26, 1993, now U.S. Pat. No. 5,590,346.

AUTHORIZATION PURSUANT TO 37 CFR 1.71 (d) (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED CASE

The present case is related to U.S. Application Ser. No. 08/081,411 filed Jun. 22, 1993 by P. Kinney now abandoned, which is hereby incorporated by reference.

TECHNICAL FIELD

The present invention relates generally to computer devices utilizing removable radio frequency communication devices used for transmitting and receiving information and more particularly to an improved apparatus for connecting an appropriate antenna to the radio frequency communication device using an antenna cap.

BACKGROUND ART

Many computer devices use modular components to allow increased flexibility and adaptability to various work environments. This is especially true in the area of small computing device such as hand held computer terminals, vehicle mounted computer terminals and small lap-top computers. Along these lines, small, removable and interchangeable memory cards were developed. The memory cards have now become commonplace and the PCMCIA memory card standard has become accepted industry wide as the format to use.

The PCMCIA memory cards are relative small with a length and width roughly the size of a credit card. The thickness of these cards is more than that of a credit card and there are several thicknesses used for different cards. These cards are designed to slide into a receiving portion of a computer device. At one end of the card is an interface section which is in essence the female portion of a connector which mates with the male end in the receiving device. This connection and design, including the number of pins, layout of the pins, and the pin size for the connection, are all part of the PCMCIA standard.

The success of the removable and interchangeable PCMCIA memory cards has led to the development of other types of peripheral devices which use the same standard. Of particular interest to the present application are the cards which contain radio transceivers. These radio transceiver devices, or radio cards, can be inserted into and connected to a receiving device in the same manner as a memory card. However, with these devices there is an addition connection which must be made to connect the transceiver device to a radio antenna.

Radio frequency communication allows two or more computer terminals to communicate without actually being wired together. Many types of radio communication exist and many different radio frequencies can and must be used to accommodate the different types of radio communication. For example, a radio which operates by sending the information on a single channel in the 902 MHz range differs from a radio which sends its information utilizing spread spectrum frequency hopping in the 2.400–2.483 GHz range. The antennas necessary to operate in the different frequency ranges also differ.

Connection of the radio card to an outside antenna is typically made by either extending the length of the card beyond the standard length with the antenna built into the extended portion or by having an antenna or telephone cable protrude out of the end of the radio card to which the user may attach an antenna or telephone line. These options have significant limitation. Both connections severely limit the type of devices which can accommodate the cards. Most devices cannot accommodate the extra length without some modification and both connections make environmentally sealing the connections difficult. Additionally, both connections are susceptible to increased damage from dropping or other physical trauma. An external antenna to which the user must couple an antenna is inconvenient and subjects the radio to periods of unreliability due to wear of the cable and connection.

As disclosed in U.S. application Ser. No. 08/081,411 filed Jun. 22, 1993 by P. Kinney, improving the connection between the radio card and the appropriate antenna can be accomplished by using antenna contacts mounted on the housing of the radio card which encounter corresponding antenna contacts mounted on the receiving portion of the computer device. This solution eliminates the need for extending the length of the radio card and permits the radio card to remain environmentally sealed.

However, while the connection of the radio card to the antenna is solved by the use of these contacts, the flexibility and interchangability of the antennas to compensate for all of the different radio cards is not. Additionally, the contact method as disclosed is not ideally suited for use with computer devices which are designed to accept cards of this type but which do not have the antenna contacts built in or for computer devices which do not have an antenna built in or attached to with which the radio card could be connected.

Thus, there is a need for an improved computer device apparatus for connecting a removable card type radio to a protected, interchangeable, environmentally sealed antenna which uses contacts located on the housing of the radio card.

DISCLOSURE OF THE INVENTION

The present invention relates generally to computer devices utilizing removable radio frequency communication devices used for transmitting and receiving information and more particularly to an improved apparatus for connecting an appropriate antenna to the radio frequency communication device using an antenna cap. A removable radio card can be inserted into a receiving device, such as a slot, through an opening in the housing of a computer device. The radio card has an electrical interface on one end which engages with an interface on the receiving device. On the opposite end of the radio card are radio card antenna contacts.

The computer device of the present invention includes a cap which engages with the opening in the housing of the computer device. The cap includes antenna contacts positioned to engage the radio card antenna contacts. The cap is connected to one end of a band. The other end of the band is connected to the housing of the computer device. An antenna can be embedded in the cap, embedded in the band or embedded in or on the housing of the computer device. Connection of the antenna contacts on the cap and of the antenna is accomplished through the cap and utilizes either wire connections or a micro shield ribbon.

Different radio cards may transmit on different frequencies and therefore need different antennas. Multiple antennas allow the radio cards to selectively transmit and receive on different antennas based upon the frequency used for communication. Additionally, two similar antennas can be used to implement an antenna diversity scheme.

An object of the present invention is to provide an antenna cap for use with computer devices utilizing radio cards.

Another object of the present invention is to provide an antenna cap which is reliable, economical and easy to use.

A further object of the present invention is to provide an antenna cap whereby an appropriate antenna will be connected to a radio card by selectively positioning the antenna contacts on the radio card.

Another object of the present invention is to provide an antenna cap whereby a radio card may simultaneously connect to and utilize more than one radio antenna.

Still another object of the present invention is to provide an antenna cap which provides an antenna for computer devices which do not have a built in antenna.

Other objects, advantages, and novel features of the present invention will become apparent from the following detailed description of the invention when considered in conjunction with the accompanying drawings.

BRIEF DESCRIPTION OF THE DRAWINGS

FIG. 10 is a partial back view taken along line 10—10 of FIG. 2 of the computer device;

FIG. 11 is a partial back view of still another embodiment built in accordance with the present invention;

FIG. 12 is a partial horizontal sectional view taken along line 12—12 of FIG. 11 of the band showing the shielded ribbon used to carry the antenna signals; and FIG. 13 is partial back view of a computer device of yet another embodiment of the present invention.

BEST MODES FOR CARRYING OUT THE INVENTION

Figure 1:
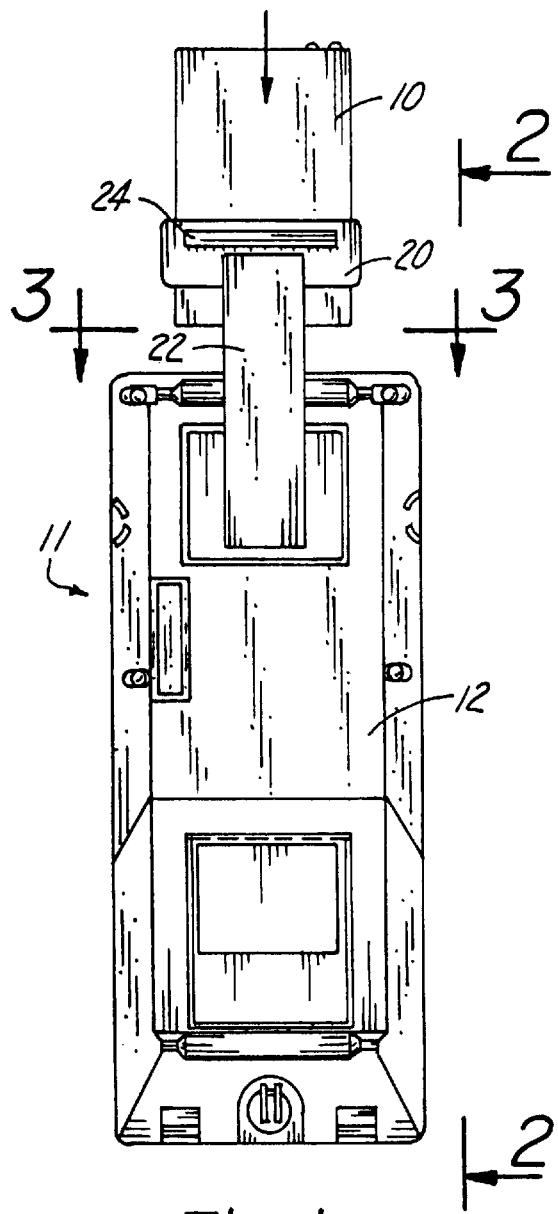
FIG. 1 is a back view of a computer device and radio card built in accordance with the present invention.
Figure 2:
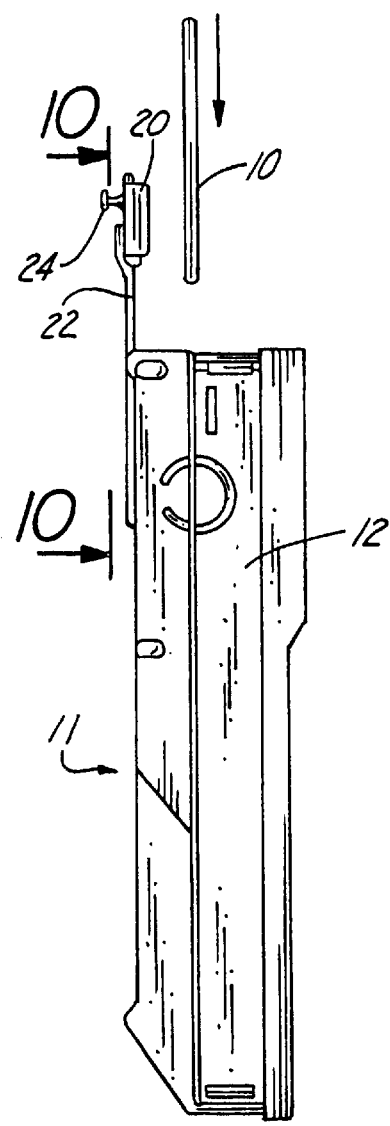
FIG. 2 is a side elevational view taken along line 2—2 of FIG. 1 of the computer device and radio card.
Figure 3:
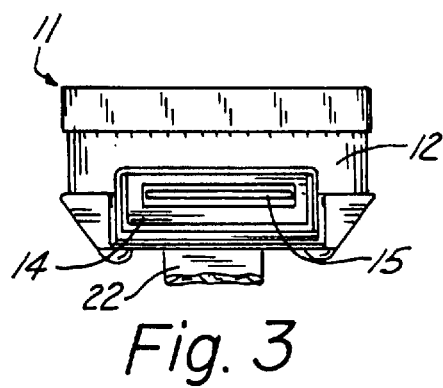
FIG. 3 is a partial top view taken along line 3—3 of FIG. 1 of the computer device.

Referring now to the drawings wherein like reference numerals designate identical or corresponding parts throughout the several views, FIGS. 1, 2 and 3 show a computer device (11) for utilizing a radio card (10) built in accordance with the present invention. The computer device (11) has a housing (12). Inside the radio card (10) is a completely operation radio transceiver (not shown). The computer device (11) has an opening (14) in the housing (12) through which the radio card (10) can be inserted into the computer device (12). In the present embodiment of the invention, the receiving means for the computer device is a slot (15).

When the radio card (10) is inserted into the slot (15) in the computer device (11) an interface between the radio card (10) and the computer device (11) is produced. The computer device (11) has a plurality of pins (not shown) which form the male portion of a connector. The radio card (10) has a corresponding plurality of holes (not shown) which form the female portion of the connector and which engage the pins. The pins are connected internally and electrically to the computer device (11) by a series of electrical connections such as wires or electrical ribbon. The holes in the radio card (10) are electrically connected to the radio transceiver. When the pins engage the holes, electrical signals can be exchanged between the radio transceiver inside the radio card (10) and the computer device (11). The electrical signals can be in the form of information exchange, power supply or both. The radio card (10) includes antenna contacts (17) to engage corresponding radio antenna contacts that are connected to an appropriate antenna.

The computer device (11) includes a cap (20) which is designed to matingly engage the opening (15) in the housing (12) of the computer device (11) and thereby cover the slot (15) used to receive the radio card (10). A flexible band (22) attaches the cap (22) to the housing (12) of the computer device (11). One end of the band (22) is connected to the cap (22) while the other end is attached to the housing (12). A handle (24) helps assist the removal of the cap (20) from the housing (12) of the computer device (11).

The cap (20) is constructed of a closed cell foam material with high air content for low dielectric losses. Alternatively, a quality dielectric material may be used to reduce the size of the antenna structure. The cap (20) when made of a foam material helps to protect the radio card from the physical trauma typically associated with computer devices of these types. Additionally, as will be discussed in further detail below, the cap (20) helps to environmentally seal the opening (14) preventing harmful material from the outside such as dust or moisture from reaching the radio card (10) and helps to reduce the escape of electronic noise from the housing (12) created by the radio card (10) and computer device (11). As will be discussed below, a grounded metal shield covering a portion of the cap (20) is used to reduce the escape of electronic noise.

While the cap (20) helps to seal the opening, protect the radio card (10) and hold the radio card in place, the primary function of the cap is to provide the radio card (10) access to an appropriate antenna or antennas. The connection of the radio card (10) to the antenna is made through the cap (20). The antenna or antennas can be embedded in the cap (20), embedded in the band (22) or even attached to, mounted on, or embedded in the housing (12) of the computer device (11).

Figure 4:
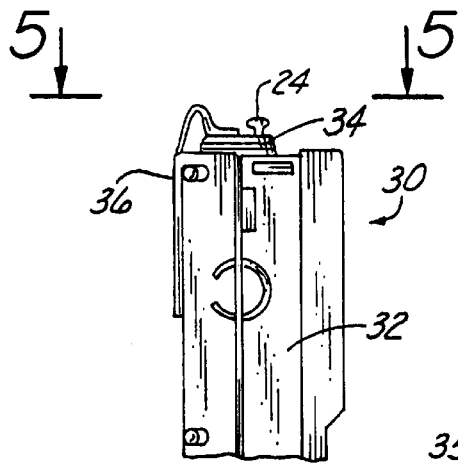
FIG. 4 is a partial side elevational view of another computer device built in accordance with the present invention.
Figure 5:
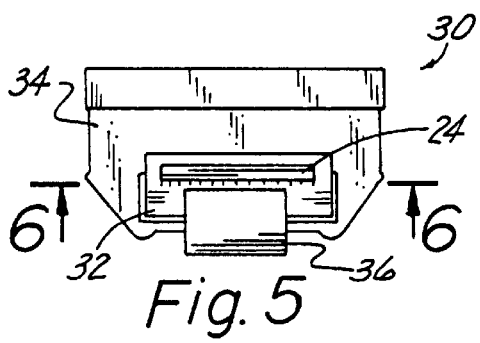
FIG. 5 is a top view taken along line 5—5 of FIG. 4 of the computer device showing the rubber cap inserted therein.

Referring now to FIGS. 4 and 5, a computer device (30) built in accordance with the present invention is shown with a cap (34) engaged in the opening of the housing (32) wherein a radio card can be inserted. A band (36) is attached to both the cap (34) and the housing (32). The band (36)

helps prevent the loss of the cap (34) when the cap (34) is not engaged in the housing (32) of the computer device (30).

Figure 7:
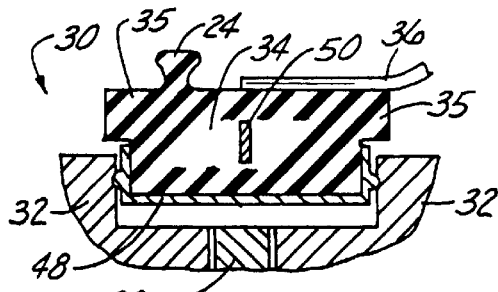
FIG. 7 is a partial vertical section view taken along line 7—7 of FIG. 6 of the rubber cap.
Figure 6:
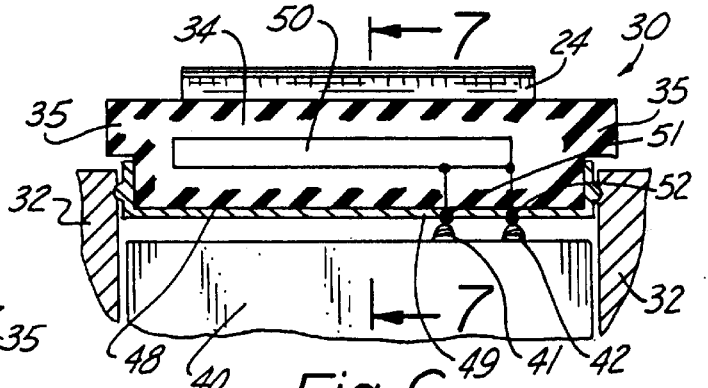
FIG. 6 is a partial vertical sectional view taken along line 6—6 of FIG. 5 showing a radio antenna embedded within the rubber cap.

Referring now to FIGS. 6 and 7, the cap (32) is shown engaged with the housing (32) of the computer device (30). The cap (34) includes an outwardly extending lip (36) which helps to environmentally seal the opening in the housing (32) preventing harmful material from the outside such as dust or moisture from reaching the radio card (40) which has been inserted into the computer device (30). When the cap (34) is completely inserted or fully engaged in the housing (32), the lip (35) sealingly engages the housing (32).

Embedded in the cap (34) is an antenna (50). The antenna (50) is connected to the radio card (40) through contacts (51 and 52) disposed on the cap (34) and contacts (41 and 42) disposed on the radio card (40). Contact (52) is the ground contact for the antenna (50) and is connected to the end of the antenna (50). Contact (42) is the ground contact for the radio card (40). Contact (51) is the signal contact and is connected to the antenna (50) a short distance from the end of the antenna (50). Contact (41) is the signal contact for the radio card (40).

Contact (51) and contact (41) are disposed on the cap (34) and the radio card (40), respectively, such that the contacts engage each other when the cap (34) is inserted into or engaged with the housing (32) of the computer device (30). Similarly, contact (52) and contact (42) are disposed on the cap (34) and the radio card (40), respectively, such that the contacts engage each other when the cap (34) is inserted into or engaged with the housing (32) of the computer device (30). The contacts shown in the present embodiment are of the metal button type wherein the connection is made when the two metal surfaces meet. Many variations of the contacts are possible including the use of male/female connections and spring type contacts.

A shield (48) is disposed around the bottom portion of the cap (34) and is used to reduce the escape of electronic noise. Typically in computer devices of this type, the inside of the housing of the computer device is shielded. Additionally, the area immediately surrounding the radio device such as a radio card may also be shielded. By shielding the cap (34), the integrity of the housing and radio shields are not breached by the opening used to insert and remove the radio card. The shield (48) is connected to the antenna ground contact (52) on the cap (34). A hole (59) in the shield (48) allows the signal contacts (51 and 41) to engage without being grounded.

Figure 8:
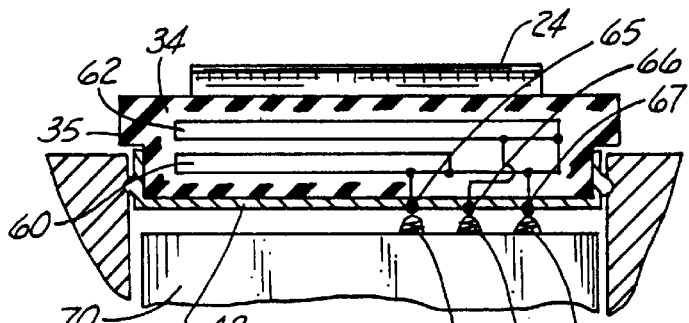
FIG. 8 is a partial vertical sectional view of another embodiment of the present invention.

Referring now to FIG. 8, the cap (34) is shown embedded within which are two antennas (60 and 62) designed to receive and transmit different radio frequency signals. The first antenna (60) and the second antenna (62) are both connected to a common ground contact (67) which is connected to the shield and which engages the ground contact (77) on the radio card (70). The first antenna (60) is connected to a first signal contact (65) and is disposed on the cap (34) to engage a first signal contact (75) disposed on the radio card (70). Similarly, the second antenna (62) is connected to a second signal contact (66) and is disposed on the cap (34) to engage a second signal contact (76) disposed on the radio card (70). Thus the radio card (70) will use a signal via contact (75) or via contact (76) depending upon which antenna it would like to use. Which antenna it would like to use is dependent upon the desired frequency upon which it want to transmit and receive.

The radio card (70) as shown has three contacts (75, 76 and 77). However, if the radio transceiver in the radio card (70) is designed such that it would only be able to transmit and receive signals which correspond to the first antenna (60), then it would not need to have contact (76) and it could be left off. Similarly, if the radio card (70) were only going to use second antenna (62) then contact (75) could be omitted. Thus, standardizing contact position with respect to antenna type allows for flexibility in cap usage with various radio cards such that only appropriate antennas will be connected to the radio card.

Figure 9:
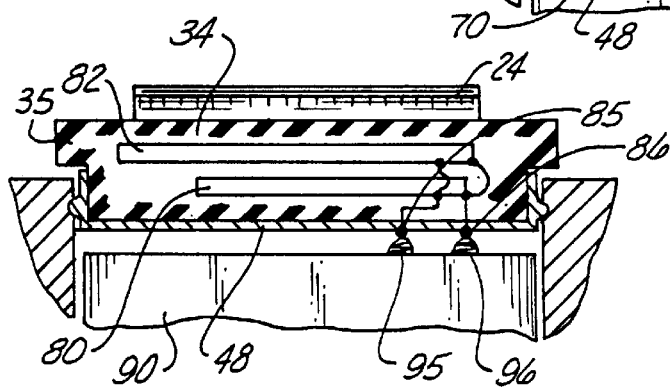
FIG. 9 is a partial vertical sectional view of still another embodiment of the present invention.

Referring to FIG. 9, two antennas (80 and 82) are embedded in the cap (34). In this embodiment built in accordance with the present invention, the two antennas (80 and 82) not only share a common ground contact (86) which engages the ground contact (96) of the radio card (90), but they also share a common signal contact (85) which engages the signal contact (95) on the radio card (90). Thus, both antennas receive and transmit signals using the same two contacts. This embodiment requires a radio card (90) which can filter the different signals and thus use the signal from the desired antenna while ignoring the signals which arrive via the other antenna.

Referring to FIG. 10, a computer device (11) built in accordance with the present invention is shown which is designed to implement an antenna diversity scheme. A first antenna (101) is embedded in the cap (20). A second antenna (102) is shown embedded in the band (22). As discussed in the embodiment as shown in FIG. 8, the two antennas (101 and 102) share a common ground contact (107). The first antenna (101) is connected to a signal contact (105). Likewise, the second antenna (102) is connected to a signal contact (106). The hole (49) in the shield (48) which prevent the signal contacts (105 and 106) from grounding is shown in dashed lines.

The first antenna (101) is similar to the second antenna (102) and both are designed to transmit and receive similar radio frequency signals. When the cap (20) is engaged in the opening of the housing (12), the first antenna (101) and the second antenna (102) will be perpendicular with respect to each other. The quality of the signal received by the first antenna (101) and the quality of the signal received by the second antenna (102) may be greatly different since the antennas are place at right angles with respect to each other. In the present embodiment, the radio card can check the quality of each signal and use the antenna which is currently receiving the stronger signal. Additionally, it can switch to the other antenna when the conditions change such that the signal is no longer acceptable. Utilizing two similar antennas in this matter, antenna diversification, can be very important in computer terminals of this type since they are often mobile and are often subjected to a rapidly changing environment. An antenna diversification scheme of this type can be used to help eliminate the reception problems associated with signal multipath.

Referring now to FIG. 11, another embodiment of the present invention is shown with the first antenna (111) and the second antenna (112) attached to the housing (12) of the computer terminal (11). As in the embodiment shown in FIG. 10, the first antenna (111) is similar to the second antenna (112) and both are designed to transmit and receive similar radio frequency signals and are perpendicular with respect to each other such that an antenna diversity scheme can be implemented. The antennas (111 and 112) are connected to the contacts (105, 106 and 107) through the cap (20) and though the band (12).

Referring to FIG. 13, the embodiment of FIG. 11 is shown with the only differences being that the first antenna (121) and the second antenna (122) are positioned slightly differently and the antennas are designed to transmit and receive different radio frequency signals. Thus, the radio card uses the signal on contact (105) when it wants to receive signals via the first antenna (121) and uses the signal on contact (106) when it wants to receive signal via the second antenna (122).

In FIGS. 10, 11 and 13, the portion of the connection between the contacts (105, 106 and 107) and the antennas which pass through the band (12) are shown schematically as wires. In the best mode of the present invention, the transmission of the signal through the band (12) would be accomplished through the use of a micro shield strip (130) as shown in FIG. 12. The micro shield strip consists of several conductive ribbons running the length of the band (12) and separated by the non-conductive material of the band (12). A wide top ribbon (133) and a wide bottom ribbon (134) are used to sandwich two smaller ribbons (136 and 137). The smaller ribbons (136 and 137) are used to transmit the antenna signals and are connected to contacts (105 and 106) respectively. The wide bands (133 and 134) are common to each other and are used to ground each of the antennas and are connected to the ground contact (107) on the cap (20). The wide ground ribbons (133 and 134) shield the smaller antenna signal ribbons (136 and 137) and help to maintain the signal integrity.

Obviously, many modifications and variations of the present invention are possible in light of the above teachings. It is therefore understood that, within the scope of the appended claims, the invention may be practiced otherwise than as specifically described.

We claim:

1. A radio assembly used in an electronic device having a device housing that has an opening, the radio assembly comprising:
   a radio card comprising a card housing, a radio circuit disposed within the card housing, and at least one antenna contact coupled to the radio circuit;
   the radio card coupling with the electronic device via the opening in the device housing;
   a cap disposed to matingly engage the opening in the device housing;
   a plurality of cap contacts disposed on the cap;
   a plurality of antennas coupled to the plurality of cap contacts; and
   the at least one antenna contact of the radio card being positioned to selectively couple with less than all of the plurality of cap contacts.

2. The radio assembly of claim 1 wherein the cap includes a lip disposed to sealingly engage the device housing at the periphery of the opening in the device housing.

3. The radio assembly of claim 1 wherein at least a portion of one of the plurality of antennas is disposed on the cap.

4. The radio assembly of claim 1 further comprising a band connected to the cap and the electronic device.

5. The radio assembly of claim 4 wherein at least a portion of one of the plurality of antennas is attached to the band.

6. The radio assembly of claim 5 wherein at least a portion of one of the plurality of antennas is disposed on the cap.

7. The radio assembly of claim 5 wherein a first of the plurality of antennas having a different orientation than a second of the plurality of antennas.

8. The radio assembly of claim 7 wherein the radio circuit selects between the first and the second of the plurality of antennas.

9. The radio assembly of claim 5 wherein a first of the plurality of antennas having a different performance characteristics than that of a second of the plurality of antennas.

10. The radio assembly of claim 9 wherein the radio circuit selects between the first and the second of the plurality of antennas.

11. A radio assembly used in an electronic device having a device housing, the radio assembly comprising:
    a radio card comprising a card housing, a radio circuit disposed within the card housing, and a plurality of antenna contacts coupled to the radio circuit;
    the radio card coupling with the electronic device when operably installed into the electronic device;
    a cap with a plurality of contacts coupled to a corresponding plurality of antennas;
    the plurality of antennas, each having different operational characteristics, coupling with the plurality of antenna contacts of the radio card via the plurality of contacts of the cap; and
    the radio circuit selecting from the plurality of antennas based on the operational characteristics of the plurality of antennas.

12. The radio assembly of claim 11 a first of the plurality of antennas having a different orientation than a second of the plurality of antennas.

13. The radio assembly of claim 11 wherein the device housing having an opening for receiving the radio card, and the cap engaging the opening of the device housing.

14. The radio assembly of claim 13 wherein at least a portion of the plurality of antennas is disposed on the cap.

15. The radio assembly of claim 13 further comprising a band connected to the cap and the electronic device.

* * * * *